United States Patent [19]
Cagliostro

[11] Patent Number: 5,939,141
[45] Date of Patent: Aug. 17, 1999

[54] WATERPROOF SILICONE COATINGS OF THERMAL INSULATION AND VAPORIZATION METHOD

[75] Inventor: Domenick E Cagliostro, Berkeley, Calif.

[73] Assignee: The United States of America as represented by the Administrator of the National Aeronautics and Space Administration, Washington, D.C.

[21] Appl. No.: 08/909,711

[22] Filed: Aug. 11, 1997

[51] Int. Cl.$^6$ ............................ B05D 1/00; C23C 16/00
[52] U.S. Cl. ............................ 427/255.11; 427/255.14; 427/255.15; 427/255.18; 427/255.24; 427/255.26; 427/255.27; 427/255.28; 427/255.4; 427/255.6; 427/255.7; 428/447; 428/448
[58] Field of Search .................. 427/109, 248.1, 427/255, 255.1, 255.2, 255.4, 255.6, 255.7, 255.11, 255.14, 255.15, 255.18, 255.24, 255.26, 255.27, 255.28; 428/447, 448

[56] References Cited

U.S. PATENT DOCUMENTS

| | | | |
|---|---|---|---|
| 4,338,368 | 7/1982 | Dotts et al. | 428/212 |
| 4,358,480 | 11/1982 | Ecord et al. | 427/140 |
| 4,439,969 | 4/1984 | Dunn | 52/404 |
| 5,038,693 | 8/1991 | Kourtides | 112/440 |
| 5,079,082 | 1/1992 | Leiser | 428/307.7 |
| 5,277,959 | 1/1994 | Kourtides | 428/116 |
| 5,296,288 | 3/1994 | Kourtides | 428/262 |
| 5,436,075 | 7/1995 | Sawko | 428/375 |

FOREIGN PATENT DOCUMENTS 664560  7/1995  European Pat. Off. .

OTHER PUBLICATIONS

Takai, Zairyo Gijutsu (1996), 14(9), pp 259–264.
Ransone, Ceram.Eng.Sci.Proc. (1983), 4(7–8), pp 564–77.
Mui et al, Ceram.Eng. Sci. Proc. (1985), 6(7–8), pp 793–805.

*Primary Examiner*—Erma Cameron
*Attorney, Agent, or Firm*—Sue H. Palk; Harry Lupuloff; John G. Mannix

[57] ABSTRACT

Thermal insulation composed of porous ceramic material can be waterproofed by producing a thin silicone film on the surface of the insulation by exposing it to volatile silicone precursors at ambient conditions. When the silicone precursor reactants are multi-functional siloxanes or silanes containing alkenes or alkynes carbon groups higher molecular weight films can be produced. Catalyst are usually required for the silicone precursors to react at room temperature to form the films. The catalyst are particularly useful in the single component system e.g. dimethylethoxysilane (DMES) to accelerate the reaction and decrease the time to waterproof and protect the insulation. In comparison to other methods, the chemical vapor technique assures better control over the quantity and location of the film being deposited on the ceramic insulation to improve the waterproof coating.

20 Claims, No Drawings

WATERPROOF SILICONE COATINGS OF THERMAL INSULATION AND VAPORIZATION METHOD

ORIGIN OF THE INVENTION

The invention described herein was made by employees of the United States Government and may be manufactured and used by or for the Government for governmental purposes without payment of any royalties thereon or therefor.

BACKGROUND OF THE INVENTION

Field of Invention

The invention relates to waterproofed insulation materials and to a vaporization method for waterproofing porous thermal insulation to minimize weight penalties due to the effects of water imbibition. More particularly, the invention relates to waterproofing porous ceramic insulation by vapor deposition of silicone precursors onto the surface of the ceramic insulation. The precursors are vaporized on the insulation forming a protective silicone outer layer. The primary application of this invention is for waterproofing ceramic materials used in heat shields for space vehicles subjected to very high aeroconvective heating environments. The silicone coatings are particularly useful for ceramic materials such as those made of silicon carbide, aluminum oxide, zirconium oxide, aluminoborosilicate silicone dioxide and the like.

More specifically, this invention relates to silicone coatings for waterproofing insulation materials such as ceramic fabrics. This invention particularly relates to a reusable thermal structure comprising ceramic materials, as a substrate, having coated thereon the protective films of this invention which provides waterproofed films and resistance to high temperatures and thermal shock. The protective coatings may be applied on flexible ceramic blankets. Examples of these blankets include various rigid and flexible, porous thermal insulating materials which have been used for the thermal protection system on the space shuttle. These porous insulating materials included AFRSI, TABI, FRCI and AETB. The AFRSI (Advanced Flexible Reusable Surface Insulation) is a flexible composite blanket type of insulation having top or outer surface fabric layer of silica fibers and a bottom surface fabric layer of borosilicate glass, with a batting in the middle of 100% silica fibers. The TABI (Tailorable Advanced Blanket Insulation) is also a flexible composite having a top and bottom surface fabric layer of silicon carbide fiber, with an interior fill or batting of Saffil (5% $SiO_2$ and 95% $Al_2O_3$) fiber. FRCI (Fibrous Refractory Composite Insulation) is a rigid tile composed of a rigidized mixture of 78% silica and 22% aluminoborosilicate fibers. The AETB (Advanced Enhanced Thermal Barrier) is also a rigid tile type of thermal insulation and has a composition of 68% silica, 12% aluminoborosilicate and 20% alumina fibers. A more detailed discussion of these flexible blankets can be found in U.S. Pat. Nos. 5,038,693 and 5,277,959 issued to D. A. Kourtides et al., the disclosures of which are hereby incorporated in this application by reference. Thus, the primary application of this invention is to protect and waterproof ceramic materials e.g. ceramic blankets used in heat shields for space vehicles subjected to very high aeroconvective heating environments.

The ceramic materials, and particularly materials which contain one or more inorganic oxides such as silicates, aluminates, aluminosilicates, borates, phosphates, titanates and the like, have hygroscopic surfaces which adsorb or imbibe moisture. Moisture adsorption can be a problem if it adds significantly to the weight of the ceramic and if the ceramic is exposed to a high temperature environment. Thermal protection systems employ both flexible and rigid ceramic insulation, with the flexible insulation often comprising various layers fabricated of ceramic fibers which may or may not include layers of metal foil. These thermal protections systems are used on reentry space vehicles, such as the space shuttle which must leave and reenter the earth's atmosphere. The space shuttle requires light weight and vary thermally efficient, rigid and flexible exterior thermal protection systems which have to withstand a wide variety of environments, including temperatures, for example, of from 1000–1600° C.

Specifically, space vehicles, such as the space shuttle which must leave and reenter the earth's atmosphere, require exterior thermal protection. The successful operation of the space shuttle requires the development of light weight and thermally efficient exterior thermal protection systems which have to withstand a wide variety of environments. These thermal protection systems (TPS) are used in the form of rigid surface insulation at high temperatures. Flexible blanket insulations are used at moderate high temperature and the oxidation protected, reinforced, rigid carbon/carbon materials are used at severe temperatures (up to −1600° C.). During reentry into the earth's atmosphere, the TPS must maintain the vehicle's exterior structure below 175° C. while experiencing substantial aeroconvective thermal environments which heats the surface of the TPS to these high temperatures. In space, the thermal protection must insulate the vehicle from the deep and constant cold (e.g., −70° C.) experienced while in orbit. In addition to thermal and aeroconvective environments, the TPS must be able to withstand the mechanical stress associated with launch vibrations, acoustics structural movement of the surface of the vehicle and of the TPS material, and the landing impact. Except for the rigid, oxidation protected carbon—carbon composites used on the nose and other leading edges of a reentry space vehicle, typical TPS insulation is a rigid or flexible, porous ceramic or ceramic composite which can imbibe water comprising one or more thermally resistant oxides, carbides, borides, silicides, borosilicates and nitrides as disclosed, for example, in U.S. Pat. Nos. 5,038,693; 5,227,959 and 5,296,288, the disclosures of which are incorporated herein by reference.

The ceramic insulation materials currently in use include high purity silicon dioxide, aluminum oxide, silicon carbide, aluminosilicate, aluminoborosilicate and zirconium diboride. These ceramics are very porous and often have a void volume of over 90%. This degree of porosity creates problems. One problem relates to hot gas, that penetration into the ceramic in the high temperature aeroconvective environment encountered on reentry. If this occurs, it can melt the substrate and outer skin of the vehicle under the ceramic insulation. These materials also wet and can result in the porous insulation absorbing more than three to five times its own weight of water. Therefore, the insulation must be waterproofed so that it is unaffected when in contact with water in any form, including high humidity. In addition to adding unacceptable amount to the weight of the insulation, the presence of water in the ceramic insulation can create other problems, such as freeze-thaw damage and explosive vaporization on reentry into the earth's atmosphere. On one occasion, as a result of a hail storm many tiles on a Space Shuttle lost their waterproofing and picked up moisture, and therefore, the orbital time line of the vehicle had to be changed to provide a favorable Sun attitude to drive the water out of the tiles before ice damage could occur. Flexible ceramic insulation is more forgiving with respect to freeze/thaw damage, but the excess weight of the absorbed water is still a significant problem. Also, the insulation must be protected from contact with salt spray if it contains silica, as salt will devitrify silica at high temperatures and destroy the insulation. Another problem relates to embrittlement of the insulation in the high temperature aeroconvective environment encountered during reentry, which makes it very susceptible to damage. Attempts to resolve these problems were found to be costly, time consuming, and difficult to apply.

There are a number of other disadvantages in the methods used in the prior art. For example, the amount of waterproof film deposited must be on the order of tenths of a percent by weight of the insulation to prevent a weight penalty. Therefore, the addition of nonvolatile, relatively dense liquid reactants to the ceramic insulation and subsequent reaction can result in a substantial weight increase in the insulation. Methods of using a dilute system in which the reactants are added to a solvent carrier to lower the weight deposited has added complications. The carrier may contaminate the work area and environment and must be removed, disposed of, or recycled. In addition, the process of impregnation usually produces a nonhomogeneous film. Moreover, removing the carrier is an added operation and thereby increases the cost and may cause delays and result in an unacceptable weight penalty for the insulation.

Further, vapor phase hydrosilation also has been used to combine a silane functionality (—SiH) with another molecule containing vinyl functionality (—CH=CH$_2$). This reaction can be facilitated by heat, peroxides, complexed metallic catalysts, U.V. light, and gamma radiation. By using the multi-functional silanes with the alkenes or alkynes, polymerization can occur on the insulation surface to form the silicone coatings. In addition, the silanes can react with a solid containing silanol groups to anchor the molecules to the surface. Alkoxysilanes are known to be used extensively for waterproofing ceramic insulation. These alkoxysilanes, however, are moisture sensitive and have some toxicity problems. The silane/vinyl systems are less reactive and considered more benign than the alkoxysilanes. The use of vapor or the CVD (chemical vapor deposition) technique of this invention assures better control over the quantity and location of film being deposited. Films can be made thin and are homogeneous by the CVD process. By this process films which are water repellent can be deposited on the insulation that are less than a percent by weight of the original insulation. Where a catalyst is used in the CVD system, the catalyst is added to, in contact with or in the proximity of the insulation to be waterproofed, but this catalyst need not touch or contaminate the insulation to be waterproofed.

SUMMARY OF THE INVENTION

The invention relates to a method and the products obtained therefrom for waterproofing, porous thermal insulation by subjecting the insulation to vapors of silicone precursors e.g. siloxanes and silanes. More particularly, the invention relates to protecting porous ceramic insulation from moisture by coating the insulation with a flexible silicone film which seals the surface of the insulation and protects the ceramic insulation with a silicone coating comprising Si, O and C atoms. The coating waterproofs the insulation and prevents moisture from entering into the interior porous structure of the insulation. The silicone coatings of this invention are derived from silicone precursors that cure quickly at ambient or room temperatures, are relatively non-toxic, and easily derived from commercially available organoprecursors of silicone. The silicone coatings are also easily reapplied. The term "silicone" means polymeric silicone which is a polymer comprising silicon, oxygen, carbon and hydrogen having Si—O bonds, Si—C bonds and C—Si—O bonds. The silicon, oxygen and carbon are present in the silicone polymer formed by curing at least one silicone precursor such as the silanes, siloxanes, sesquisiloxanes, alkoxysilanes, and low molecular weight cyclo and polysiloxanes.

This invention particularly relates to a process of waterproofing porous ceramic insulation materials which comprises exposing said ceramic insulation materials to effective amounts of at least one volatilized low molecular weight silicone precursor which has a vapor pressure greater than about 0.01 m.m. of mercury at temperatures ranging from about 0° C. to 60° C. for a period sufficient to form a waterproof film of silicone on the ceramic insulating material. At least one of the silicone precursor is selected from the Group consisting of low molecular weight organopolysiloxanes, organosilanes, organosiloxanes and combinations thereof in any ratio.

Accordingly, it is an object of this invention to prepare thermal insulation comprising flexible thermal ceramics whose outer surface is coated and sealed with silicone derived from a room temperature cured precursor of silicone.

It is another object of this invention to provide a method of using vaporized silicone precursors that cure at about room temperature to a silicone coating of the surface of the insulation.

It is still a further object of this invention to provide a method comprising coating the surface of the thermal protective material with silicone precursors in amounts sufficient to form a continuous coating of said precursor on the surface and curing said precursor to form a solid continuous coating thereon which waterproofs the ceramic material.

These and other objects of the invention will become apparent from a further and more detailed disclosure of the invention.

DETAILED DESCRIPTION OF INVENTION

The ceramic insulation materials protected by the vaporization method of this invention includes ceramic fabrics and flexible blankets such as Advanced Flexible Reusable Surface Insulation (AFRSI), Composite Flexible Blanket Insulation (CFBI) and Tailed Advanced Blanket Insulation (TABI) which comprise silicone oxide, aluminoborosilicate 312, aluminoborosilicate 440, zirconium oxide, hafnium oxide and silicone carbide. Rigid ceramic insulating materials which may be protected include all existing reusable surface insulations (RSI), such as Lockheed Insulation LI-900 and LI-2200, Fibrous Refactory Ceramic Insulation (FRCI) Advanced Enhanced Thermal Barrier and Ames Insulation Materials. The materials are illustrative, and not limiting of the ceramic insulating materials which may be protected by the vapor deposition method. The silicone coating of the invention are able to protect the surface of flexible and rigid ceramic thermal insulation at temperatures as high as 1600° C. for several heating cycles in a high temperature, oxidative aeroconvective environment as measured in an Arc Jet Test. By heating cycle is meant rapidly heating the material up to the desired temperature in an Arc Jet Test, holding it at that temperature for five minutes, and then cooling down. More important, the vaporization method provides a system for protecting both flexible and rigid porous ceramic insulation from water absorption and using commercially available silicone precursors to form the protective and reusable coatings which are easily applied to the ceramic insulation, easily repaired and replaced without removing the insulation from the vehicle. The method of this invention coats and seals the surface of the insulation, thereby providing waterproofing to protect the porous, hygroscopic ceramic insulation from absorbing water or moisture from penetrating into the interior of the insulation. The silicone coatings obtained from the process of this invention are preferably derived from silanes and siloxanes, in liquid form, which dry and cure in air at ambient conditions. The process provides a silicone coating which water proofs the surface of the porous thermal insulation. More important, the application of a coating by the method of the invention adds very little weight to the insulation.

The silicone precursors of this invention are low molecular weight siloxanes or silanes having organic substitutents of $C_1$–$C_4$ carbons e.g. $C_1$–$C_2$ carbons that can be used to form a vapor deposition of silicone on the surface of the insulation materials from the vapor phase. Therefore, these silicone precursors must be volatile or have an appreciable vapor pressure at ambient conditions e.g. about room temperature. More specifically, the silicone precursors of this invention should have an appreciable vapor pressure greater than 0.01 m.m. of Hg in a temperature range from about 0–60° C. The silicone precursors can react together or co-react with other precursors and/or condense and react with the solid substrate e.g. ceramic surface to form the silicone coating. Some of the preferred compounds, for purpose of this invention, include at least one silicone precursor selected from the Group consisting of divinyltetramethyldisiloxane, tetramethyldisiloxane, dimethylethoxysilane, tetramethylcyclotetrasiloxane and various combinations thereof in any ratio.

In practice, the vapors of the silicone precursors are applied to the outer surface of the porous thermal insulation material, such as the rigid and flexible thermal insulation materials used on a space shuttle. The vapor deposition method may also be used to protect various insulations and ceramics, including inorganic thermal insulation materials such as Nextel 312 and 440 fabrics. The vapors of the silicone precursors form a coating over the surface of the insulation which waterproofs and protects the porous structure from conditions such as water, rain and salt spray.

The following Examples illustrates the vaporization process and the products obtained therefrom in accordance with the invention.

EXAMPLE 1

A thermal insulation in the form of a blanket is waterproofed by forming a silicone film on its surface. The blanket material is composed of Nextel 440 woven facesheets and Saffil batting. This blanket has been coated with a thin layer of silica on facesheets and batting. The sample is 2"×2"×1" and hexachoroplatinate (two component catalyst system) in distilled water is wicked and distributed by capillary action of the weave across the facesheets. The sample is dried in air at 100° C. and weighed. The blanket contains 0.44% by weight platinum. The sample is then inserted into a 6"×6" plastic bag and sealed. While inside the bag 0.25 ml of tetramethyldisiloxane (TMDS, b.p. 70° C.) and 0.25 ml of divinyltetramethyldisiloxane (DVTMDS, b.p. 139° C.), are injected into the center of the sample, volatilize and react. The sample is left in the bag for 17 hrs. then opened and weighed to constant weight. The sample gained 1.2% in weight compared to its weight before exposure to the reactants. The sample is then immersed in distilled water for 15 min. and reweighed to determine the waterpickup after immersion. The sample contained 5.5% water. The sample is dried at room temperature and about 5 hours later reimmersed. The sample gained 3.0% water. The sample is dried and reimmersed 1 day later. The sample gained 2.8% water. The sample is dried and immersed 6 days later. The sample gained 2.9% water. Reimmersion shows that the water repellency is stable over time.

EXAMPLE 2

The sample is the same as in Example 1, only no catalyst is added. The sample is inserted into a 6"×6" plastic bag and sealed. While inside the bag 0.25 ml of TMDS and 0.25 ml of DVTMDS, are injected into the center of the sample. The sample is left in the bag for 20 hrs. then opened and weighed to constant weight. The sample lost 0.04% in weight compared to its weight before exposure to the reactants. The sample is then immersed in distilled water for 15 min. and reweighed to determine the waterpickup after immersion. The sample contained 198.4% water. The sample is dried at room temperature and about 5 days later reimmersed. The sample gained 230% water. The sample is dried and reimmersed 26 days later. The sample gained 230% water. This example illustrates some repellency is developed even without catalyst.

EXAMPLE 3

Samples are the same as in Example 1 only they are not exposed to catalyst or reactants. The samples are immersed in distilled water for 15 min. and weighed to determine the waterpickup after immersion. The samples contain 600–1200% water.

EXAMPLE 4

The sample is the same as in Example 1 only 0.18% Pt catalyst is added. The sample is inserted into a 6"×6" plastic bag and sealed. While inside the bag 0.25 ml of TMDS and 0.25 ml of DVTMDS, are injected into the center of the sample. The sample is left in the bag for 100 min. then opened and weighed to constant weight. The sample gained 1.8% in weight compared to its weight before exposure to the reactants. The sample is then immersed in distilled water for 15 min. and reweighed to determine the waterpickup. The sample contained 4.9% water. The sample is dried at room temperature and about 4 days later reimmersed. The sample gained 2.1% water. The sample is dried and reimmersed 25 days later. The sample gained 1.4% water. The sample is dried and a ¼" core taken from its center, then immersed in red dyed water. The sample gained 6.8% water. After drying no dye was apparent in the cored area of the sample. Some dye was apparent on the sides of the batting. This proves that the water repellency can develop on the order of minutes and extends throughout the thickness of the sample.

EXAMPLE 5

The sample is the same as in Example 1 only 1.5% Pt catalyst is added to a separate piece of fabric facesheet 2"×2" (0.1 Pt based on blanket weight) and this facesheet is placed against the top of the blanket. The sample with the separate Pt catalyst on the fabric is inserted into a 6"×6" plastic bag and sealed. While inside the bag 0.25 ml of TMDS and 0.25 ml of DVTMDS, are injected into the center of the sample. The sample is left in the bag for 100 min. then opened, the fabric catalyst removed, and blanket weighed to constant weight. The blanket gained 1.3% in weight compared to its weight before exposure to the reactants. The sample is then immersed in distilled water for 15 min. and reweighed to determine the waterpickup after immersion. The sample contained 5.1% water. The sample is dried at room temperature and 4 days later reimmersed. The sample gained 3.5% water. The sample is dried and reimmersed 5 days later. The sample gained 1.8% water. The sample is dried and reimmersed 25 days later. The sample gained 2.4% water. This example illustrates the catalyst need not be contained in the blanket.

EXAMPLE 6

The sample is the same as in Example 1 only 0.72% Pt catalyst is added to a separate piece of fabric facesheet 2"×2" (0.05% Pt based on blanket weight) and this facesheet is placed inside the bag not touching the blanket about 2" from the sample. While inside the bag 0.25 ml of TMDS and 0.25 ml of DVTMDS, are injected into the center of the sample. The sample is left in the bag for 100 min. then opened and blanket weighed to constant weight. The blanket lost 0.3% in weight compared to its weight before exposure to the reactants. The sample is then immersed in distilled water for 15 min. and reweighed to determine the waterpickup. The sample contained 9.2% water. The sample is dried at room temperature and 1 day later reimmersed. The sample gained 14.3% water. The sample is dried and reimmersed 21 days later. The sample gained 9.3% water. This example illustrates the catalyst need not be in contact with the blanket.

EXAMPLE 7

The sample is the same as in Example 1 except it has not been treated to contain a silica coating on it surface. 0.19% Pt catalyst is added to the top of the blanket. The sample is inserted into a 6"×6" plastic bag and sealed. While inside the bag 0.25 ml of TMDS and 0.25 ml of DVTMDS, are injected into the center of the sample. The sample is left in the bag for 100 min. then opened and weighed to constant weight. The sample gained 4.0% in weight compared to its weight before exposure to the reactants. The sample is then immersed in distilled water for 15 min. and reweighed to determine the waterpickup. The sample contained 23.4% water. The sample is dried at room temperature and about 2 days later reimmersed. The sample gained 6.9% water. The sample is dried and reimmersed 20 days later. The sample gained 3.7% water. This example illustrates that repellency is developed even on non-silica treated insulations.

EXAMPLE 8

The sample is the same as in Example 1 and 0.02% Pt catalyst is added to its facesheet. The sample is inserted into a 6"×6" plastic bag and sealed. While inside the bag nitrogen gas is passed through two bubblers containing the reactants at 22° C., the vapor effluents are mixed and sent into the plastic bag containing the blanket for 30 min. A total of 0.18 ml of TMDS and 0.03 ml of DVTMDS, are delivered to the bag. The sample is weighed to constant weight. The sample gained 0.12% in weight compared to its weight before exposure to the reactants. The sample is then immersed in distilled water for 15 min. and reweighed to determine the waterpickup. The sample contained 14.3% water. The sample is dried at room temperature and about 18 days later reimmersed. The sample gained 1.8% water. This example illustrates that repellency is developed on just exposure to vapors at various concentrations.

EXAMPLE 9

The sample is the same as in Example 1 and 0.02% Pt catalyst is added to its facesheet. The sample is inserted into a 6"×6" plastic bag and sealed. While inside the bag nitrogen gas is passed through two bubblers containing the reactants at 22° C., the effluents are mixed and sent into the plastic bag containing the blanket for 30 min. A total of 0.11 ml of TMDS and 0.11 ml of DVTMDS, are delivered to the bag. The sample is weighed to constant weight. The sample gained 0.08% in weight compared to its weight before exposure to the reactants. The sample is then immersed in distilled water for 15 min. and reweighed to determine the waterpickup. The sample contained 5.5% water. The sample is dried at room temperature and about 1 day later reimmersed. The sample gained 4.7% water. The sample is dried at room temperature and about 18 days later reimmersed. The sample gained 2.8% water. This example illustrates that repellency is developed on just exposure to vapors at various concentrations.

EXAMPLE 10

The sample is the same as in Example 1 and 0.015% pt catalyst is added to its facesheet. The sample is inserted into a 6"×6" plastic bag and sealed. While inside the bag nitrogen gas is passed through two bubblers containing the reactants at 22° C., the effluents are mixed and sent into the plastic bag containing the blanket for 30 min. A total of 0.14 ml of TMDS and 0.13 ml of DVTMDS, are delivered to the bag. The sample is weighed to constant weight. The sample gained 0.03% in weight compared to its weight before exposure to the reactants. The sample is then immersed in distilled water for 15 min. and reweighed to determine the waterpickup. The sample contained 5.1% water. The sample is dried at room temperature and about 17 days later reimmersed. The sample gained 6.0% water.

EXAMPLE 11

The sample is the same as in Example 1 and 0.003% Pt a low catalyst concentrate is added to its facesheet. The sample is inserted into a 6"×6" plastic bag and sealed. While inside the bag nitrogen gas is passed through two bubblers containing the reactants at 22° C., the effluents are mixed and sent into the plastic bag containing the blanket for 30 min. A total of 0.11 ml of TMDS and 0.14 ml of DVTMDS, are delivered to the bag. The sample is weighed to constant weight. The sample lost 0.008% in weight compared to its weight before exposure to the reactants. The sample is then immersed in distilled water for 15 min. and reweighed to determine the waterpickup. The sample contained 418% water. This example illustrates that repellency is a function of catalyst concentration.

EXAMPLE 12

The sample is the same as in Example 1 and 0.011% Pt catalyst is added to its facesheet. The sample is inserted into a 6"×6" plastic bag and sealed. While inside the bag nitrogen gas is passed through two bubblers containing the reactants at 22° C., the effluents are mixed and sent into the plastic bag containing the blanket for 30 min. A total of 0.15 ml of TMDS and 0.14 ml of DVTMDS, are delivered to the bag. The sample is weighed to constant weight. The sample lost 0.04% in weight compared to its weight before exposure to the reactants. The sample is then immersed in distilled water for 15 min. and reweighed to determine the waterpickup. The sample contained 380% water. This example illustrates that repellency is a function of catalyst concentration.

EXAMPLE 13

The sample is the same as in Example 1 and 0.047% Pt catalyst is added to its facesheet. The sample is inserted into a 6"×6" plastic bag and sealed. While inside the bag nitrogen gas is passed through two bubblers containing the reactants at 22° C., the effluents are mixed and sent into the plastic bag containing the blanket for 30 min. A total of 0.11 ml of TMDS and 0.13 ml of DVTMDS, are delivered to the bag. The sample is weighed to constant weight. The sample gained 0.09% in weight compared to its weight before exposure to the reactants. The sample is then immersed in distilled water for 15 min. and reweighed to determine the waterpickup. The sample contained 6.0% water. The sample is dried at room temperature and about 7 days later reimmersed. The sample gained 6.7% water. This example illustrates that repellency is a function of catalyst concentration.

EXAMPLE 14

The sample is the same as in Example 1 only 0.02% Pt catalyst is added. The sample is inserted into a 6"×6" plastic bag and sealed. While inside the bag 0.25 ml of TMDS and 0.25 ml of 1,2,5,7 tetramethyltetrasiloxane (TMTS), are injected into the center of the sample. The sample is left in the bag for 100 min. then opened and weighed to constant weight. The sample gained 1.4% in weight compared to its weight before exposure to the reactants. The sample is then immersed in distilled water for 15 min. and reweighed to determine the waterpickup. The sample contained 20.7% water. The sample is dried at room temperature and about 4 days later reimmersed. The sample gained 2.1% water.

EXAMPLE 15

The sample is the same as in Example 1 and 0.016% Pt catalyst is added to its facesheet. The sample is placed in a hood. A total of 0.25 ml of TMDS and 0.25 ml of DVTMDS are added to the top facesheet and its weight monitored. After 30 min. the sample is weighed to constant weight. The sample gained 0.19% in weight compared to its weight before exposure to the reactants. The sample is then immersed in distilled water for 15 min. and reweighed to determine the waterpickup. The sample contained 352% water. The sample is dried at room temperature and about 8 days later reimmersed. The sample gained 184% water. This example illustrates that some repellency can be developed after spray-on application.

EXAMPLE 16

Single Component Systems

The sample is the same as in Example 1. 0.02% Pt catalyst is added to the top of the blanket. The sample is inserted into a 6"×6" plastic bag and sealed. While inside the bag 0.05 ml of volatile dimethylethoxysilane (DMES) is injected into the center of the sample. The sample is left in the bag for 15 min. then opened and weighed to constant weight. The sample lost 0.04% in weight compared to its weight before exposure to the reactants. The sample is then immersed in distilled water for 15 min. and reweighed to determine the waterpickup. The sample contained 4.6% water. The sample is dried at room temperature and about 1 day later reimmersed. The sample gained 3.3% water. This example illustrates that repellency is developed very rapidly and is stable for catalyzed DMES waterproofing.

EXAMPLE 17

The sample is the same as in Example 1. No Pt catalyst is added to the top of the blanket. The sample is inserted into a 6"×6" plastic bag and sealed. While inside the bag 0.1 ml of dimethlyethoxysilane (DMES) is injected into the center of the sample. The sample is left in the bag for 15 min. then opened and weighed to constant weight. The sample lost 0.06% in weight compared to its weight before exposure to the reactants. The sample is then immersed in distilled water for 15 min. and reweighed to determine the waterpickup. The sample contained 14.1% water. The sample is dried at room temperature and about 1 day later reimmersed. The sample gained 103.5% water. This example illustrates that repellency is unstable for short application periods of DMES when uncatalyzed.

EXAMPLE 18

The sample is the same as in Example 1. 0.02% Pt catalyst is added to the top of the blanket. The sample is inserted into a 6"×6" plastic bag and sealed. While inside the bag 0.1 ml of dimethlyethoxysilane (DMES) is injected into the center of the sample. The sample is left in the bag for 30 min. then opened and weighed to constant weight. The sample gained 0.15% in weight compared to its weight before exposure to the reactants. The sample is then immersed in distilled water for 15 min. and reweighed to determine the waterpickup. The sample contained 1.4% water. The sample is dried at room temperature and about 1 day later reimmersed. The sample gained 1.2% water. The sample is dried and reimmersed 3 days later. The sample gained 1.4% water. This example illustrates that repellency is developed very rapidly and is stable for catalyzed DMES waterproofing.

EXAMPLE 19

The sample is the same as in Example 1 except it has not been treated to contain a silica coating on its surface. 0.02% Pt catalyst is added to the top of the blanket. The sample is inserted into a 6"×6" plastic bag and sealed. While inside the bag 0.1 ml of dimethlyethoxysilane (DMES) is injected into the center of the sample. The sample is left in the bag for 30 min. then opened and weighed to constant weight. The sample gained 0.25% in weight compared to its weight before exposure to the reactants. The sample is then immersed in distilled water for 15 min. and reweighed to determine the waterpickup. The sample contained 1.0% water. The sample is dried at room temperature and about 1 day later reimmersed. The sample gained 0.5% water. This example illustrates that repellency is developed very rapidly and is stable for catalyzed DMES waterproofing even when the alumina is not coated with silica.

EXAMPLE 20

The sample is the same as in Example 1 only 0.7% Pt catalyst is added to a separate piece of fabric facesheet 2"×2" (0.05% Pt based on blanket weight) and this facesheet is placed inside the bag not touching the blanket about 2" from the sample. While inside the bag 0.1 ml of DMES is injected into the center of the sample. The sample is left in the bag for 30 min. then opened and blanket weighed to constant weight. The blanket lost 0.02% in weight compared to its weight before exposure to the reactants. The sample is then immersed in distilled water for 15 min. and reweighed to determine the waterpickup. The sample contained 45.8% water. The sample is dried at room temperature and burned out at 1000° C. in air for 15 min. The sample then inserted in another bag with the same cloth catalyst and the same waterproofing procedure followed again. After immersion in water the sample contained 2.3% water. The same burnout and rewaterproofing procedures are followed and the sample reimmersed. The sample contained 0.7% water. This example shows that the same catalyst remains effective after multiple uses, the sample need not be in contact with the catalyst, and burnout does not deleteriously effect but can enhance the rewaterproofing process.

EXAMPLE 21

The blanket (NEXTEL) sample similar to that used in example 1 is placed in a bag and 0.25 ml of volatile tetramethylcyclotetrasiloxane (TMCTS) is injected into the center of the blanket and held in a bag for 50 minutes. The bag is opened and the sample weighed to constant weight. The sample gained 1.06% weight. The sample is immersed in water and re weighed to determine the water pickup. The sample gained 20.3% water. The sample is dried at room temperature and reimmersed the $4^{th}$ day. The sample gained 5.13% water. The sample is dried and reimmersed the $5^{th}$ day and gained 4.2% water. This illustrates the volatile TMCTS imparts effective water repellency in about an hour, without a catalyst, and the water repellency is stable with time.

EXAMPLE 22

A sample of blanket is exposed to 0.26 ml of TMCTS vapors issuing from a bubbler similar to the process described in example 8. The time of exposure is 60 minutes. After the first immersion the sample picked up 15.1% water. Reimmersion 1 day later resulted in a water pickup of 17.6%. Three days later after reimmersion the sample picked up 26.6% water. This illustrates vapors of TMCTS impart water repellency with short exposure.

EXAMPLE 23

TMCTS (0.5 ml) is sprayed on the top of the fabric of the Nextel blanket. It evaporated at room temperature. The sample gained 2.3% in weight. After immersion it gained 6.9% in weight of water. At the end of 1 day after reimmersion the sample gained 6.03% in water. At the end of 2 days the sample gained 7.03%. This illustrates volatile TMCTS may be sprayed on to develop water repellency.

EXAMPLE 24

TMCTS (0.25 ml) is injected in a silica based blanket (AFRSI) weighing 4.6590 g (2"×2"×0.41") contained in a bag. Contact to the vapors is maintained for 18.6 hours. Water pickup is 12.9%. After 14 days the water pickup is 4.23%, after 40 days, 2.66%. This illustrates TMCTS can impart water repellency to a silica based blanket.

EXAMPLE 25

The TMCTS (0.4 ml) is sprayed on the facesheet of the AFRSI blanket and allowed to evaporate. The sample is immersed and gained 0.9% water. After 12 days the sample is reimmersed and gained 4.5% water. This illustrated TMCTS may be sprayed on to a silica based blanket to develop water repellency.

EXAMPLE 26

The TMCTS (0.4 ml) is sprayed on the top of a rigid silica based tile (FRCI 12) and allowed to evaporate at room temperature. The tile is immersed in water and gains 77.3% water. After 14 days the sample is reimmersed and gains 3.0% water. This illustrates that TMCTS may be sprayed on to a rigid silica tile to develop water repellency.

EXAMPLE 27

The rigid tile as in example 26 is placed in a 6"×6" plastic bag along with 0.5 ml of TMCTS in an aluminum pan. The liquid TMCTS and the tile are not in contact. The TMCTS evaporates into the bag. The tile is removed from the bag in 50 minutes. The tile gained 4.39% in water on immersion. The tile is reimmersed 12 days later and gained 4.18% water. This illustrates the vapors of TMCTS develop water repellency in a silica tile.

EXAMPLE 28

The AFRSI blanket is placed in a bag as in example 28 and not in contact with liquid TMCTS. The bag is opened in 55 minutes. Water pickup is 3.22%. After 12 days the blanket is reimmersed and gained 6.0% water. This illustrates vapors of TMCTS develop water repellency in silica based blankets.

EXAMPLE 29

Water and TMCTS are mixed in a ratio of 4 ml to 0.2 ml. A FRCI 12 tile is immersed in the mixture. The tile is dried in a few days. At the end of the $5^{th}$ day the sample is immersed in water and gained 1.83% water. After 12 days the sample is reimmersed and gained 2.02% water. This example illustrates the insulation may be waterproofed using a dilute aqueous solution of TMCTS but it takes days for the carrier to be evaporated and water repellency to be developed compared to minutes for the vapor method.

EXAMPLE 30

The mixture of water and TMCTS is added to an AFRSI blanket and dried in a few days. On the $5^{th}$ day the sample is immersed in water and gained 199.2% water. On the $7^{th}$ day after reimmersion the sample gained 26.5% water. This illustrates that an aqueous mixture of TMCTS developed water repellency in days compared to minutes for the vapor method.

One or more of the silicone precursors e.g. siloxanes or silanes are used in amounts sufficient to form a film or coating of silicone on the surface of the insulation material. The preferred methods of coating the insulation materials are the liquid injection, vapor injection and spray-on application of the precursors. In the liquid method, the insulation material may be placed in the sealed bag and the liquid is injected into the center wherein the liquid silicone precursor vaporizes and reacts with the insulation material to form a film or coating thereon. In the spray-on method, the precursor is sprayed on the face of the insulation, thereby vaporizing and diffusing the reacting throughout the interior of the insulation. The amount of liquid silicone precursor and the time of exposure will vary with the type of silicone precursor, the type of catalyst, the type of insulation being coated and the conditions under which the reaction takes place. The reaction between the insulation material and the silicone precursor can take place in the presence of one or more catalysts, with or without nitrogen, to help accelerate the reaction. More specifically, the catalyst may be in contact or remote from the surface of the insulation material to avoid contamination of the coating. The preferred catalyst e.g. platinum can be used in amounts ranging from about 0.003 to 1.0% by weight of the insulation material and preferably from 0.01 to 0.7% by weight of the insulation. In another method, the silicone precursors are vaporized in bubblers using a carrier gas such as nitrogen or air. The carrier gas and vapors of the precursors are passed into the sealed bag containing the insulation materials. The flow of gas and vapors of the silicone precursor is maintained for various lengths of time, under ambient conditions, depending on the type of insulation materials and the precursor. The amount of time of exposure and the amount of silicone precursor will vary depending on the type of insulation being coated and the silicone precursor being used to form a sufficient amount of coating to render the insulation material waterproofed.

While this invention has been described by a number of specific examples, it is obvious that there are other variations and modifications which can be made without departing form the spirit and scope of the invention as particularly set forth in the appended claims.

The invention claimed is:

1. A process of waterproofing a porous ceramic insulating material which comprises exposing said ceramic insulating material for a period sufficient to form a waterproof coating thereon to an effective amount of at least one vaporized low molecular weight silicone precursor in the presence of a catalyst; said silicone precursor having a vapor pressure greater than about 0.01 mm of mercury in the temperature range of about 0° C. to 60° C.; said silicone precursor being selected from the group consisting of organosiloxanes, organosilanes and combinations thereof wherein the organo substitutents of the silanes and siloxanes have $C_1$ to $C_4$ carbon atoms.

2. The process of claim 1 wherein the silicone precursor is an organosilane.

3. The process of claim 2 wherein the silane is dimethylethoxysilane.

4. The process of claim 1 wherein the silicone precursor is an organosiloxane.

5. The process of claim 3 wherein the silicone precursor is dimethylethoxsiloxane.

6. The process of claim 1 wherein the silicone precursor is a combination of an organosilane and an organosiloxane.

7. The process of claim 1 wherein a catalytic amount of a platinum catalyst is present during the vaporization of the silicone precursor.

8. The process of claim 5 wherein the catalyst is hexachloroplatinate.

9. The process of claim 5 wherein the silicone precursor is a combination of silanes and siloxanes.

10. The process of claim 9 wherein the siloxane is tetramethyldisiloxane.

11. The process of claim 5 wherein the silicone precursor is tetramethyltetrasiloxane.

12. The process of claim 5 wherein the ceramic material is coated with a thin layer of silica.

13. The process of claim 1 wherein the siloxane is divinyltetramethlydisiloxane.

14. The process of claim 1 wherein the vaporization coating of the ceramic material with the silicone precursor takes place in the presence of nitrogen gas.

15. The process of claim 1 wherein the porous ceramic insulation material is a blanket material.

16. The process of claim 1 wherein the ceramic blanket insulation material is coated with a thin layer of silica.

17. The process of claim 16 wherein the ceramic insulation material contains a catalyst for curing the silicone precursor on the surface of the ceramic.

18. The silicone-coated waterproof ceramic material obtained by the process of claim 1.

19. The silicone-coated waterproof ceramic material obtained by the process of claim 2.

20. The silicone-coated waterproof ceramic material obtained by the process of claim 3.

* * * * *